Feb. 28, 1956  N. F. ANDREWS ET AL  2,736,152
VEHICLE-ATTACHABLE AGRICULTURAL MACHINE UNIT
Filed April 5, 1952  6 Sheets-Sheet 1

INVENTORS
N. F. Andrews, W. E. Slavens &
E. W. Adolphson
BY
Attorneys

INVENTORS
N. F. Andrews, W. E. Slavens &
E. W. Adolphson
BY
Attorneys

Feb. 28, 1956 N. F. ANDREWS ET AL 2,736,152
VEHICLE-ATTACHABLE AGRICULTURAL MACHINE UNIT
Filed April 5, 1952 6 Sheets-Sheet 3

INVENTORS
N.F. Andrews, W.E. Slavens &
E.W. Adolphson
BY
Attorneys

United States Patent Office 2,736,152
Patented Feb. 28, 1956

2,736,152

VEHICLE-ATTACHABLE AGRICULTURAL MACHINE UNIT

Norman F. Andrews, Ankeny, and Wayne E. Slavens and Evert W. Adolphson, Des Moines, Iowa, assignors to Deere Manufacturing Co., Dubuque, Iowa, a corporation of Iowa Application April 5, 1952, Serial No. 280,821

28 Claims. (Cl. 56—15)

This invention relates to agricultural machines and more particularly to that type of machine made up of one or more units selectively attachable to or detachable from a vehicle or other mobile frame such as a conventional agricultural tractor. As will appear hereinafter, the invention is not limited in any respect to the peculiarities of the particular agricultural machine or tractor but resides more in the means whereby attachability and detachability are accomplished.

A preferred form of the invention finds particular utility in a tractor-mounted corn harvester or picker in which the harvesting or picking units are mounted on the tractor in such manner as to provide a self-propelled machine capable of picking or harvesting two rows of corn simultaneously, together with the utilization of an elevating or material-handling unit also selectively mountable on or demountable from the tractor, which elevating unit is utilized for the purpose of transferring the harvested corn from the harvesting units to a wagon or other suitable receptacle towed by the self-propelled machine.

The typical agricultural tractor with which are used row units of the general type referred to above comprises a longitudinal, relatively narrow body carried at its rear end on a pair of relatively widly spaced traction wheels and at its front end by a steerable truck consisting of either a single wheel or a pair of relatively closely spaced wheels. A harvesting unit is positioned at each side of the tractor between the body and the proximate traction wheel to gather corn crops ahead of the rear axle as the tractor is driven forwardly. Whether or not the harvesting units include husking mechanisms, the harvested corn is ultimately delivered to a zone rearwardly of the tractor axle, at which point a hopper is provided for receiving the harvested corn. Normally an elevator is associated with the hopper for conveying the corn from the hopper to a point rearwardly of and at a level higher than the tractor for ultimate discharge into a trailing wagon. As is the case with many other agricultural operations, the corn harvesting season is of relatively short duration and for that reason it is expedient to provide the harvesting and elevating units in such manner that they may be readily detached from the tractor so that the tractor may be used for other purposes. Likewise, the dismounting means must be so constructed as to permit the harvesting and elevating units to be readily remounted on the tractor for the next harvesting season.

Although there is nothing original in the idea of attempting to accomplish simple and easy mounting and dismounting of agricultural units on tractors or similar vehicles, the present invention is considered as providing distinct and novel advantages over known designs. Considered in this light, it is broadly an object of the invention to provide improved mounting and dismounting means so constructed as to accelerate the attachment and detachment of agricultural units to and from agricultural tractors, for example, and to utilize in the accomplishment of this a design in which major components of the structure involved serve as many functions as possible without requiring any material alterations in the basic vehicle design. Accordingly, it is a more specific object to utilize supporting structure in which many of the supporting parts are detachable from the tractor along with the agricultural unit and remain or are stored with the unit so as to free the tractor as far as possible for use with other implements with little or no interference from the remaining attaching components on the tractor.

The invention has for another object the provision of improved means for mounting certain drive parts for the harvesting and elevating units in such manner that, although these parts are in effect part of the units, they are readily positionable for connection to the power source—such as the conventional power take-off—on the tractor. In the background is the fundamental proposition of facilitating attachment of the agricultural units to the vehicle by supporting the units in such manner that the vehicle may be driven into place. An incidental object is achieved in this respect by the provision of attaching parts that guide the units into place on the tractor. Another object of the invention resides in the utilization of the tractor power source as a means whereby manual effort is greatly minimized so that all that is required of the user is the installation of a few simple attaching members and the locking into place of specially provided locking elements.

Further objects of the invention comprise the provision of various sub-combination structures usable in connection with the tractor and the particular agricultural machine unit, which structures, although not primarily a part of either the tractor or the agricultural unit, are themselves readily attachable to and detachable from the tractor as part of the scheme to adapt the agricultural unit to the tractor without affecting the basic design of the tractor.

The foregoing objects, although broadly stated, involve various other specific but nonetheless important objects that are inherent in and encompassed by the invention, all of which will appear as the disclosure of the preferred embodiment of the invention is made in the following detailed description and accompanying sheets of drawings in which.

For the purpose of facilitating as far as possible an understanding of the detailed structure involved in the present disclosure, reference will be had to the parts as having front and rear ends, right- and left-hand sides, etc. Since the purpose of the specific reference is one of convenience rather than limitation, it should be understood that no restrictions are to be thus imported into the invention.

A general description of the entire machine as constituted during normal operation may be beneficial in comprehending the over-all picture.

Figures 3, 7, 16, 17:
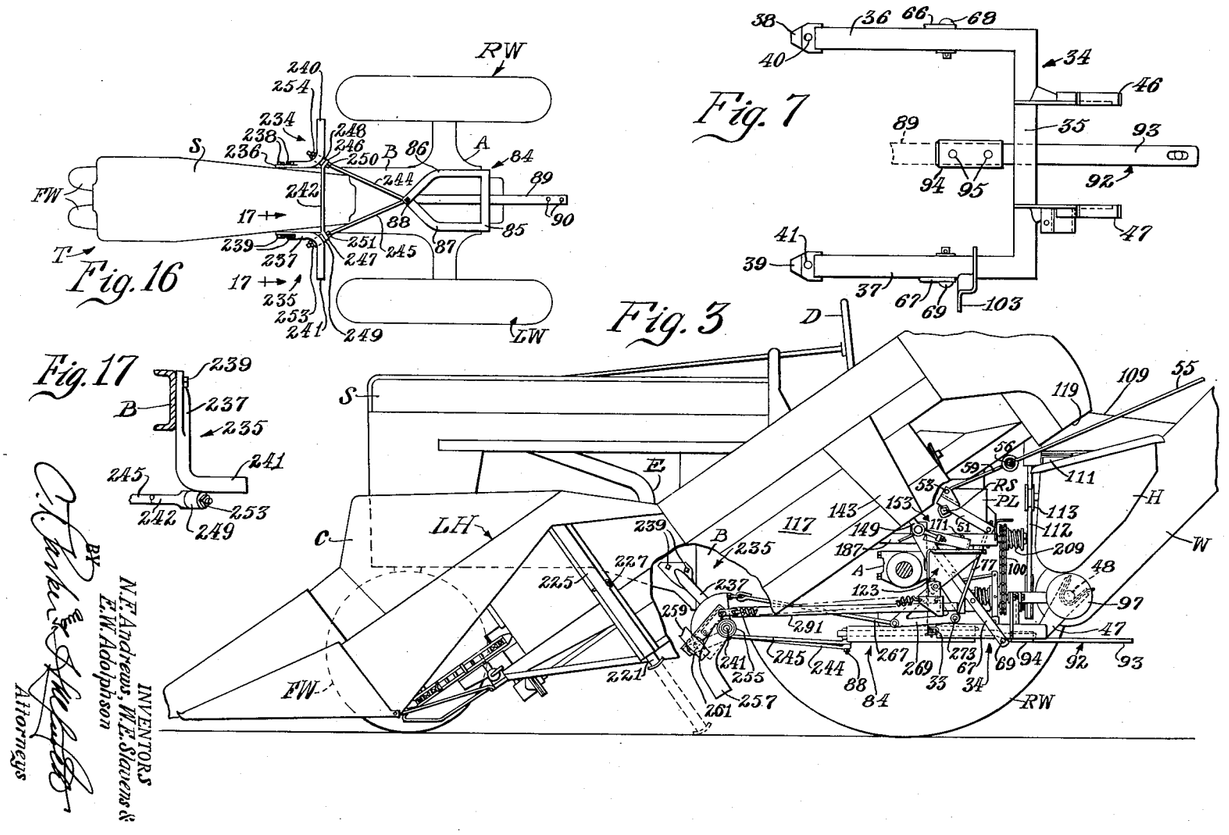
Figure 3 is a side elevational view, partly in section and with parts broken away, of the same machine.
Figure 7 is a plan view of the elevating unit support as it appears apart from that unit and apart from the tractor.
Figure 16 is a plan view of the tractor (shown in light outline) and part of the basic unit-mounting structure (shown in heavy outline)
Figure 17 is a fragmentary sectional view, on an enlarged scale, taken on the line 17—17 of Figure 16.

A conventional type of agricultural tractor, designated generally by the letter T, is representative of a mobile supporting frame for the self-propelled machine. The tractor is carried at its rear end on relatively widely spaced right- and left-hand traction wheels RW and LW and at its front end on a single steerable truck FW (Figures 3 and 16). The body of the tractor, designated by the letter B is relatively long and narrow (Figure 16) and is supported between the traction wheels RW and LW by a transverse rear axle structure A. The tractor, as viewed from above (Figure 16), is thus generally in the shape of the letter T and affords space at the right- and left-hand sides thereof and ahead of the axle structure A for an agricultural machine, here a two-row corn picker having right- and left-hand harvesting units RH and LH. A central divider shield C encloses the forward end of the tractor and front wheel truck FW so that there is provided at each side of the machine a crop-gathering throat such as that designated by the letter G in Figure 1. Although such throat for the right-hand harvesting unit RH is not shown, it will be understood that a throat is nevertheless present. Thus, the machine is enabled to operate simultaneously on two parallel rows of corn, the tractor front wheel running between the rows and the traction wheels straddling the rows, as is conventional.

Each harvesting unit contains crop-harvesting mechanism such as conventional corn-picking or -snapping mechanism and the harvested corn is delivered upwardly and rearwardly over the tractor rear axle structure A to a common receptacle or hopper H from which a wagon elevator W leads upwardly and rearwardly to deliver the corn to a trailing wagon or equivalent vehicle (not shown) connected behind the machine. The wagon elevator could, of course, be replaced by any other crop-handling unit such as a sheller, etc., all of which falls within the spirit of this invention.

Figures 5, 10, 15:
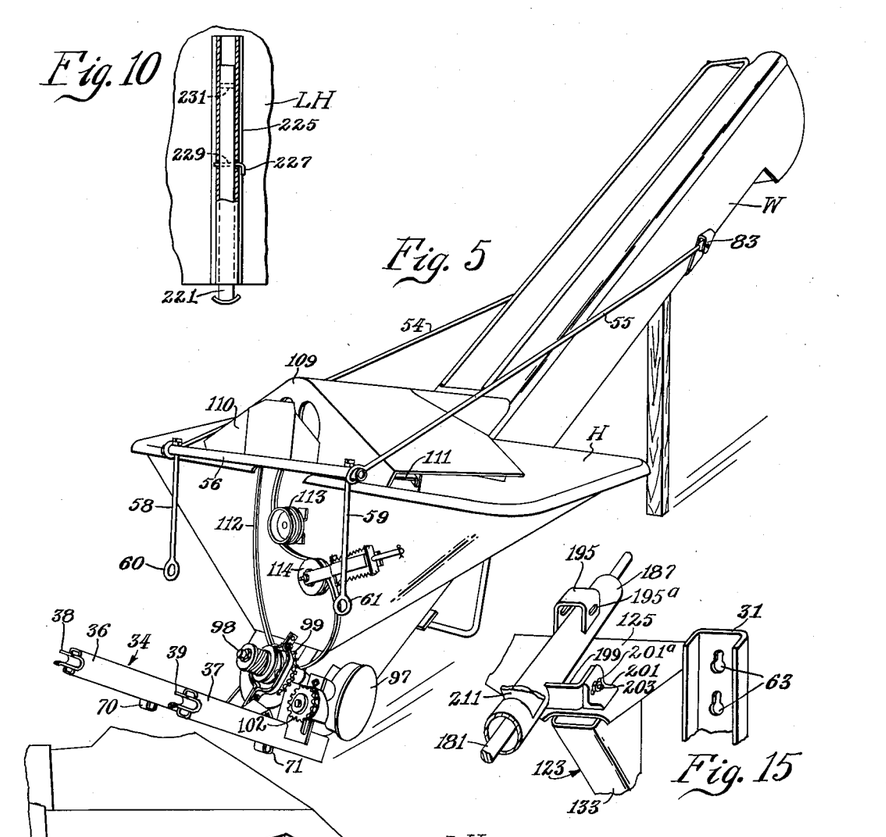
Figure 5 is a perspective view of the detached elevating unit.
Figure 10 is a fragmentary view, partly in section, showing the construction of one of the legs for supporting the detached harvester units.
Figure 15 is a similar fragmentary perspective view showing a different relationship of attaching parts as seen by one looking generally in the direction of the arrow bearing the encircled numeral 15 in Figure 4.
Figures 9, 13, 14:
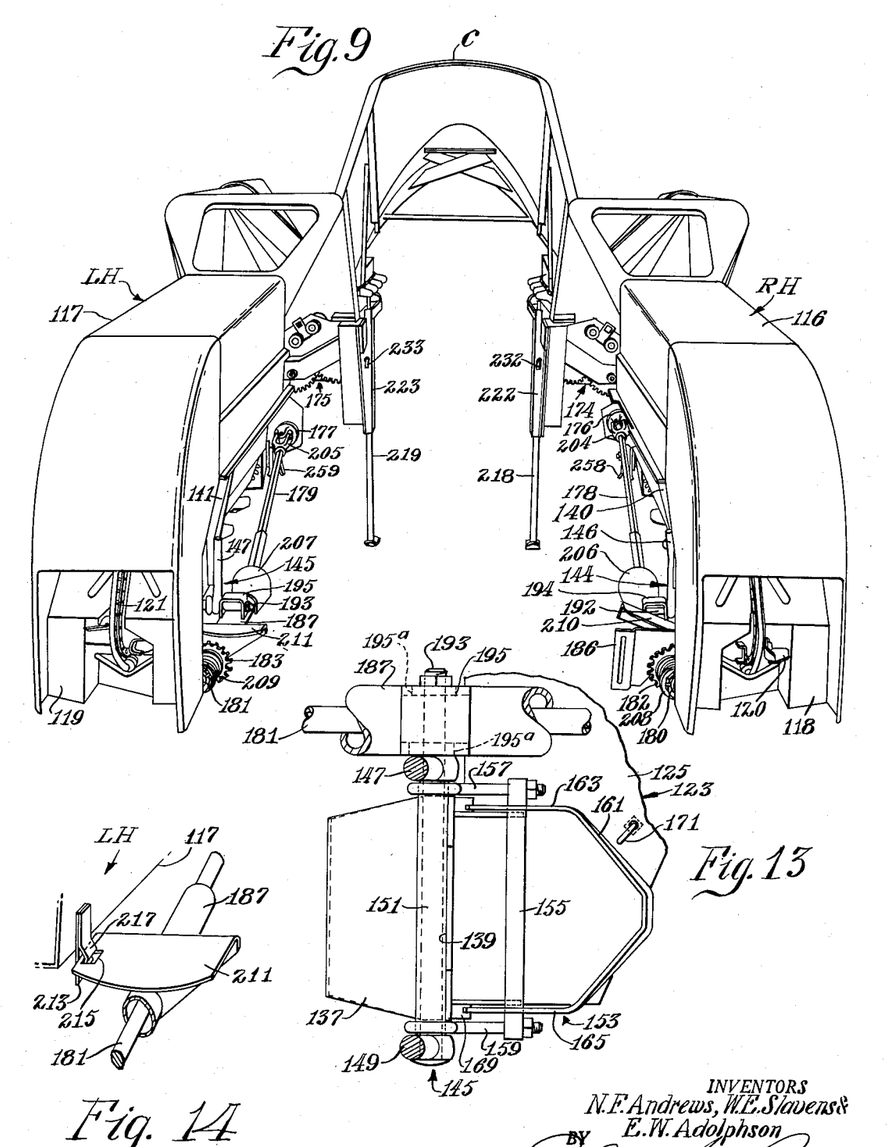
Figure 9 is a perspective view, as seen by an observer looking forwardly, of the two removed or detached harvesting units.
Figure 13 is a plan view on an enlarged scale and partly in section as seen along the line 13—13 of Figure 12.
Figure 14 is a fragmentary perspective view of related parts as seen by one looking generally in the direction of the arrow bearing the encircled numeral 14 in Figure 11.

Figure 5 shows the detached wagon elevator W and hopper H and Figure 9 shows the detached harvesting units RH and LH, from which it will be appreciated that these units comprise a not inconsiderable proportion of the entire machine. In order that units of this character may be utilized with a conventional tractor, it is necessary that provision be made for readily combining and separating these units and the tractor. The accomplishment of this object eliminates the need for a specially constructed self-propelled machine or, in the alternative, a self-contained machine that can be drawn behind the tractor. It is deemed unnecessary here to enlarge upon the advantages of the tractor-mounted machine over either of the other two types.

In order that the relationship of the agricultural units, of which those disclosed are representative, may be better understood with reference to each other and with reference to the tractor, certain not unconventional details of the tractor must be comprehended.

As previously stated, the tractor has the longitudinal, relatively narrow body B supported on the wheels FW, RW and LW. The forward portion of the body carries a power source, here in the form of an internal combustion engine E, conventionally enclosed by a radiator and grille structure S. Behind this is the usual operator's seat O from which the operator has access to the various controls for operating the machine, one of which is a conventional steering wheel D for steering the front steerable truck FW.

The tractor illustrated is provided with a power lift unit PL preferably formed as a detachable component of the rear axle structure A and customarily provided with the tractor either as regular or optional equipment. So far as the present invention is concerned, the power lift unit may be of any type. That illustrated is essentially similar to that shown in U. S. Patent 2,532,552. The power lift is of the hydraulic type and is powered by a pump (not shown) driven in any suitable manner from the tractor engine E to accomplish selective rocking of a power lift rockshaft RS. The power from this rockshaft is utilized not only to accomplish adjustment of the harvesting units during operation but also to facilitate mounting and dismounting of these units as well as the mounting of the wagon elevtaor unit W (of which the hopper H here forms a part).

The drivable parts of the agricultural units are driven by means of a conventional power take-off shaft PTO at the rear of the tractor. This shaft derives power from the tractor engine in any suitable and conventional manner. The power lift unit PL is under control of an operating lever L accessible to an operator on the operator's seat O. The power take-off control is not shown; suffice it to say that normally the power take-off shaft will be driven during travel of the machine (although, it may be disengaged if desired).

The relationship of the wagon elevator W and hopper H to the tractor will be first described. The tractor is adapted to receive this unit by provision of suitable attaching structure mounted on the rear axle structure A. In the present case, this structure comprises right- and left-hand mounting brackets 30 and 31 preferably easily detachably secured to the axle housing A and depending below the level of the axle housing to carry, respectively, mounting elements in the form of pins 32 and 33. For all practical purposes, the supporting structure 30—31 may be considered part of the rear axle structure A.

The wagon elevator and hopper units W—H include a mounting frame shown by itself in Figure 7 and designated generally by the numeral 34. This frame is of U shape, having a transverse rear member or bight 35 and right- and left-hand longitudinally extending legs 36 and 37. The legs are provided respectively at their forward or free ends with bifurcated members 38 and 39 adapted respectively to receive the mounting pins 32 and 33 on the mounting structure 30—31. The bifurcated members 38 and 39 are respectively apertured at 40 and 41 to receive removable connecting elements in the form of pins, one of which is shown at 43 in Figure 6. Each of these pins may be releasably retained by removable cotters, such as indicated at 45 in Figure 6.

Figure 6:
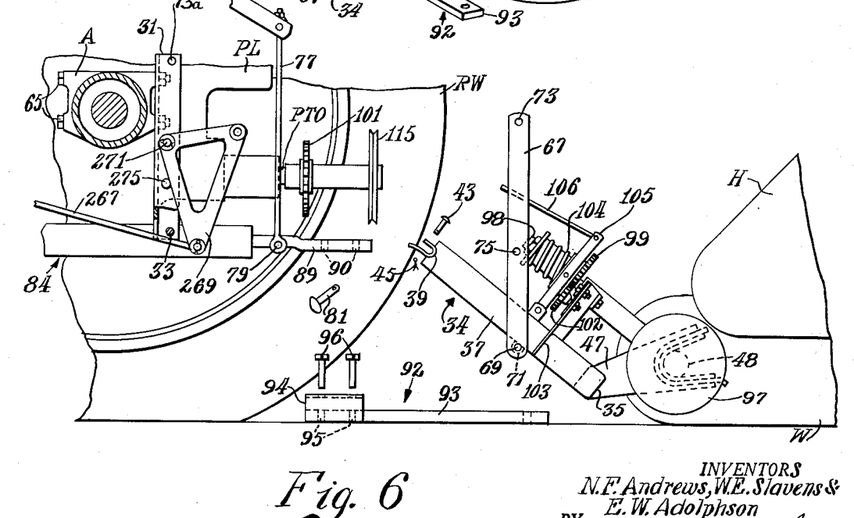
Figure 6 is a fragmentary side elevational view (with certain parts omitted for clarity) illustrating the manner of attaching and detaching the elevating unit as respects the tractor, the general plane of the view in regard to the tractor being indicated by the line 6—6 in Figure 4.

The transverse member 35 of the wagon elevator mounting framework 34 has a pair of rearwardly extending right- and left-hand bifurcated brackets 46 and 47 for receiving a transverse shaft 48 at the lower end of the wagon elevator W (Figures 3 and 6). Suitable bearings (not shown) on the shaft 48 establish a pivotal mounting on a transverse axis between the units W—H and the framework 34. This pivotal connection is not material here except to explain the difference between the position of the wagon elevator in Figure 5 and that in Figure 6. In Figure 5, the wagon elevator is supported at its lower end on the framework 34, which rests on the ground. The rear portion of the wagon elevator may be carried by any convenient support, such as shown, which may be temporary or permanent as desired. Without a support such as shown in Figure 5, the wagon elevator may be allowed to lie flat on the ground as shown in Figure 6. In either event, the forward and upward inclination of the framework 34 is necessary to aline the bifurcated receiving members 38 and 39 with the mounting pins 32 and 33 on the tractor. Thus, the tractor may be backed toward the detached wagon elevator unit (Figure 6) until the pins 32 and 33 are respectively received by the bifurcated members 38 and 39, after which the securing pins 43 may be inserted.

Figure 4:
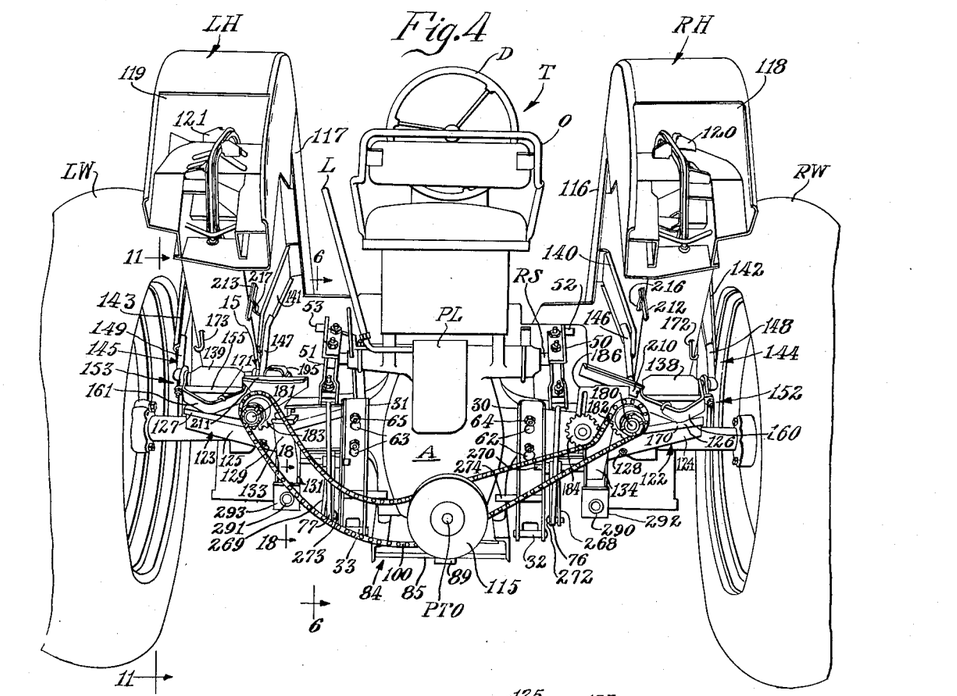
Figure 4 is a rear view of the machine as it appears with the elevating unit removed.

As best appears in Figure 4, the power lift rockshaft RS extends at each side of the power lift unit or housing PL. Opposite end portions of the rockshaft RS have affixed thereto right- and left-hand power-transmitting arms 50 and 51. The arm 50 may have rigid therewith a second arm 52. A similar arm 53 is similarly associated with the left-hand power-transmitting arm 51. When the wagon elevator unit is in its mounted position on the tractor (Figures 2 and 3), the weight of the upper end thereof is supported in part by a pair of stay rods 54 and 55, which are connected at their rear ends to a rear upper portion of the wagon elevator unit and which are cross-connected at their forward ends by means of a transverse member 56 and right- and left-hand links 58 and 59. The free end of the link 58 is provided with an eye 60 which is detachably connectible to the arm 52 on the right-hand power-transmitting arm 50 The other link 59 has a similar eye 61 for similar association with the left-hand arm 53.

As previously stated, the conventional tractor must ordinarily be modified in some respects to carry an agricultural implement. In the present case, the modification utilized for the purpose of receiving and carrying the wagon elevator W includes the supporting structure comprising the brackets or mounting members 30 and 31 and the pins or members 32 and 33, which provide a pivot on a transverse axis. The bracket 30 has a pair of keyhole slots 62 which are received by nut and bolt assemblies 64 on the tractor axle structure A. Similar keyhole slots 63 and nut and bolt assemblies 65 function to secure the left-hand bracket 31 to the tractor axle structure.

The bifurcated portions 38 and 39 at the forward ends of the legs 36 and 37 of the wagon elevator supporting frame 34 provide forwardly opening pockets for receiving the transversely alined or coaxial pivot pins 32 and 33. In order that the wagon elevator W may be moved from the position of Figure 6 to the mounted position of Figure 2, a combination of manual effort and power furnished by the tractor is utilized. When the tractor is backed toward the ground-supported wagon elevator, the pins 32 and 33 are received respectively in the forwardly opening bifurcated portions 38 and 39 and the connecting pins (such as 43 in Figure 6) are inserted. The wagon elevator supporting frame 34 has means in the form of a pair of attachment links 66 and 67 pivotally connected at their lower ends at 68 and 69 to the frame legs 36 and 37. The pivotal connections 68 and 69 are separable so that the links 66 and 67 can be removed from the elevator frame 34 if desired. Figure 5 shows that the legs 36 and 37 of the frame 34 are provided respectively with bearing loops 70 and 71 for receiving the pivotal connections 68 and 69.

While the elevator is in its ground-supported position (Figure 6), the attaching links 66 and 67 extend upwardly. The link 67 is provided at its upper end with an aperture or opening 73 and has intermediate its ends a second aperture or opening 75. The link 66 is constructed along the same lines and, although this link is not shown in detail, it will be understood that the two links are similar.

The power-transmitting arms 50 and 51 on the rockshaft RS of the power lift unit PL respectively have depending therefrom power-transmitting or lifting links 76 and 77 which, during normal operation of the machine, are connected to mechanism for adjusting the harvesting units RH and LH. This function of the lifting links may be ignored for the moment, since in the mounting of the wagon elevator the links are disconnected from the adjusting mechanism and are available for furnishing power to raise the wagon elevator to operating position. As shown in Figure 6, the depending link 77 has its lower end provided with an eye 79 which is substantially at the same level as the intermediate opening 75 in the attaching link 67 when the power-transmitting arm 51 is substantially in its lowermost position.

When the wagon elevator frame 34 is connected to the tractor via 32—38 and 33—39, the opening 75 in the link 67 is in transverse registry with the eye 79 at the lower end of the lifting link 77. It will be appreciated, of course, that the same situation obtains at the right-hand side of the structure. Any suitable connecting means, such as removable pins, one of which is shown at 81 in Figure 6, may be passed through the alined openings and eyes (i. e., 75—79) for effecting a power lift connection between the power lift unit PL and ground-supported wagon elevator.

Since the wagon elevator is conventionally constructed of sheet metal and is relatively light, one man may easily lift it about its pivotal connection at 48 so that the eyes or loops 60 and 61 of the links 58 and 59 may be respectively connected to the arms 52 and 53 respectively on the power-transmitting arms 50 and 51. The power lift is then operated to effect upward swinging of the arms 50 and 51 and the force transmitted by the lifting links, such as 77, operates to elevate the wagon elevator frame 34 to its horizontal operating position.

As an alternative to the procedure just outlined, the stay rods 54 and 55 may have been previously disconnected from the wagon elevator W. Figure 5 illustrates at the left-hand side of the wagon elevator a representative form of detachable connection at 83 that may be utilized for this purpose. In such case, the loops or eyes 60 and 61 at the forward ends of the links 58 and 59 may be preliminarily connected to the arms 52 and 53 and, when the wagon elevator is raised manually to its upwardly inclining position, the connection may be effected at 83 (and at a similar point at the right-hand side of the wagon elevator W) instead of at 52—60 and 53—61. Whichever method is used is a matter of choice and the details are not important here. Therefore, elaboration of the point is deemed unnecessary.

It is another feature of the invention to provide at least a temporary support for holding the wagon elevator substantially in its operating position for permitting a connection to be made between the upper ends of the links 66 and 67 and the upper ends of the supporting or mounting brackets 30 and 31. At least a temporary support is desired for effecting disconnection between the links 66 and 67 and the power lift links 76 and 77.

As best shown in Figure 16, the tractor has a rear drawbar structure 84 comprising a transverse rear member 85 and right- and left-hand forwardly converging side members 86 and 87. The side members are interconnected at 88 on a vertical axis that provides a pivot for a rearwardly extending draft member or hitch 89. This member is provided at its rear end with a pair of openings 90. The draft means 84 may be rigidly secured to the tractor in any suitable manner, as by being bolted to the bottom of the transverse axle structure A, which details are not important here.

When the wagon elevator framework 34 is moved to its horizontal position by the power lift means on the tractor, the undersurface of the frame 34 moves to a level somewhat higher than the level of the top surface of the draft member 90. Since the longitudinal distance between the pivot axis 32—33 and the bight 35 of the frame 34 exceeds the distance between the pivot axis 32—33 and the extreme rear end of the hitch or draft member 89 (Figures 6 and 7), the frame 34 easily clears the hitch member during its upward travel. At this time, the wagon elevator frame is connected to the tractor only at 32—33 and by means of the lifting links 76 and 77 and attaching links 66 and 67.

The support for the frame 34 while the change is made in the transfer of the load-sustaining connection from the power lift links 76 and 77 to the mounting brackets 30 and 31 is effected by a trailer or wagon hitch 92. This hitch forms in effect a rearward extension of the hitch or draft member 89 and comprises essentially an elongated bar 93 having at its forward end means providing a forwardly opening socket 94 in which is received the rear end of the hitch member 89. The socket-forming means has a pair of apertures 95 which register with the apertures 90 in the hitch member 89; and securing means, such as a pair of pins or bolts 96, is utilized to secure the trailer hitch to the tractor hitch. The bar 93 of the trailer hitch thus extends rearwardly beneath the transverse portion or bight 35 of the wagon elevator frame 34 and prevents downward movement of the frame 34 while the power lift links 76 and 77 are respectively disconnected from the attaching links 66 and 67. The attaching links 66 and 67 may be now pivoted forwardly on their pivotal connections 68 and 69 and the upper ends thereof may be connected to the upper ends of the mounting members or brackets 30 and 31. As appears in Figure 6, the upper end of the mounting bracket 31 serves as a connecting element for the link 67 and for that purpose has a transverse opening or aperture 73a with which registers the aperture 73 at the upper end of the attaching link 67. Similar structure (not illustrated in detail) is present at the right-hand side. For the purpose of effecting a supporting connection at 73—73a, any suitable means may be used. As a matter of fact, the pin 81, having been removed from the connection 75—79 may be utilized at 73—73a. A similar result obtains at the right-hand side of the structure. Thus, the power lift is now free for use in mounting and adjusting the harvesting units LH and RH.

There is considerable versatility available in the mounting arrangement just described, particularly as respects the utility of the trailer hitch 92. For example, the weight of the wagon elevator may be supported entirely by the attaching links 66 and 67 after they have been connected to the mounting brackets or members 30 and 31, thus leaving the trailer hitch 92 free to swing as an extension of the hitch member 89 about the vertical pivot at 88. If this is undesirable, the trailer hitch may be utilized to support at least part of the weight of the wagon elevator, thus relieving the attaching links 66 and 67 of at least this part of the load. This may be desirable for several reasons, depending upon the designed strength of the attaching parts and the desire to have the trailer hitch 92 fixed or swingable.

Removal of the wagon elevator from the tractor may be easily accomplished by a reversal of the procedure just outlined.

The wagon elevator W may include a conventional endless conveyor (not shown) driven by means including the shaft 48. The pivotal mounting of which the shaft 48 forms a part includes a gear casing 97 from which an input shaft 98 extends forwardly. This shaft and the shaft 48 are interconnected by suitable gearing (not shown) contained within the casing 97 and the shaft 98 has keyed thereto a sprocket 99 driven by a chain 100 from a sprocket 101 on the power take-off shaft PTO. An idler sprocket 102 is journaled in a bearing carried in a bracket 103 fixed to the left-hand leg 37 of the wagon elevator framework 34 and performs its usual chain-tightening function. The wagon elevator drive may be selectively connected and disconnected by means of a suitable clutch 104 controlled by a lever 105 and forwardly extending link 106. These details form no part of the present invention and are illustrated and described only for the purposes of disclosing a representative mechanism.

Figure 2:
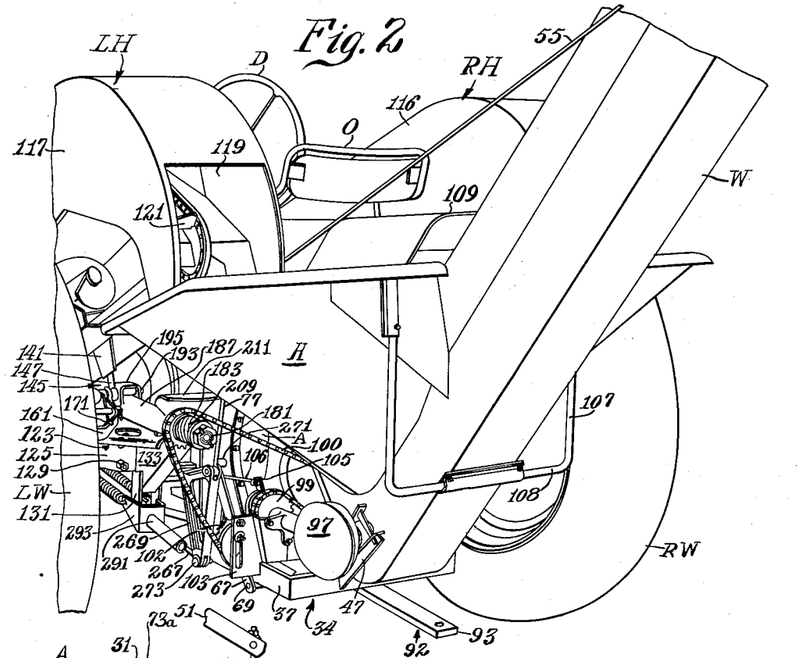
Figure 2 is a fragmentary perspective view of the same machine as seen from the rear.

As best shown in Figure 2, the hopper H is braced to the wagon elevator W by means of a U-shaped support 107 having a lower transverse member or bight 108 of greater width than that of the wagon elevator W so that side portions of this member may serve as steps or rungs to aid the operator in mounting on and dismounting from the machine.

The upper portion of the hopper (Figure 5) may include a conventional fan housing 109 within which is contained a fan (not shown) containing one or more discharge outlets for facilitating the separation of corn and trash. The right-hand outlet is shown at 110 and the left-hand outlet at 111. Again, the structure is only representative. The fan may be driven by an endless belt 112 trained about a pair of idlers 113 and 114 and about a sheave 115 keyed to the tractor power take-off shaft PTO.

The machine was previously described as having the right- and left-hand units RH and LH which operate simultaneously to gather corn from a pair of parallel adjacent rows as the machine advances over the field. After the corn is gathered, it moves upwardly in the units to be discharged at the rear ends thereof to the wagon elevator hopper H. To this extent, each of the units RH and LH may be of conventional construction. For example, the right-hand unit includes an elongated sheet metal enclosure 116, rectangular in section and inclining upwardly and rearwardly from the right-hand gathering throat to an upper discharge end 118 immediately over the right-hand side of the wagon elevator hopper H. An endless conveyor, part of which is visible at 120 in Figures 4 and 9, operates to elevate the picked or snapped corn from the gathering means. Similar structure in the left-hand unit is designated by the numerals 117, 119 and 121.

Each of the units RH and LH is supported on the tractor by pivot means on a transverse horizontal axis so that the units may have vertical movement relative to the tractor in order to accommodate variations in ground contour and also to permit of adjustment between operating and transport positions. Since the structure at the left-hand side of the machine is better illustrated than that at the right-hand side of the machine, reference will be had thereto in the following detailed description and uneven reference numerals will be used. Corresponding parts where visible in the right-hand unit will bear even reference numerals.

The left-hand part of the tractor axle structure A is provided with auxiliary supporting structure designated generally by the numeral 123 (Figures 4, 11, 13 and 15). Similar auxiliary supporting structure 122 is carried by the right-hand part of the tractor axle structure A.

Figures 1, 11:
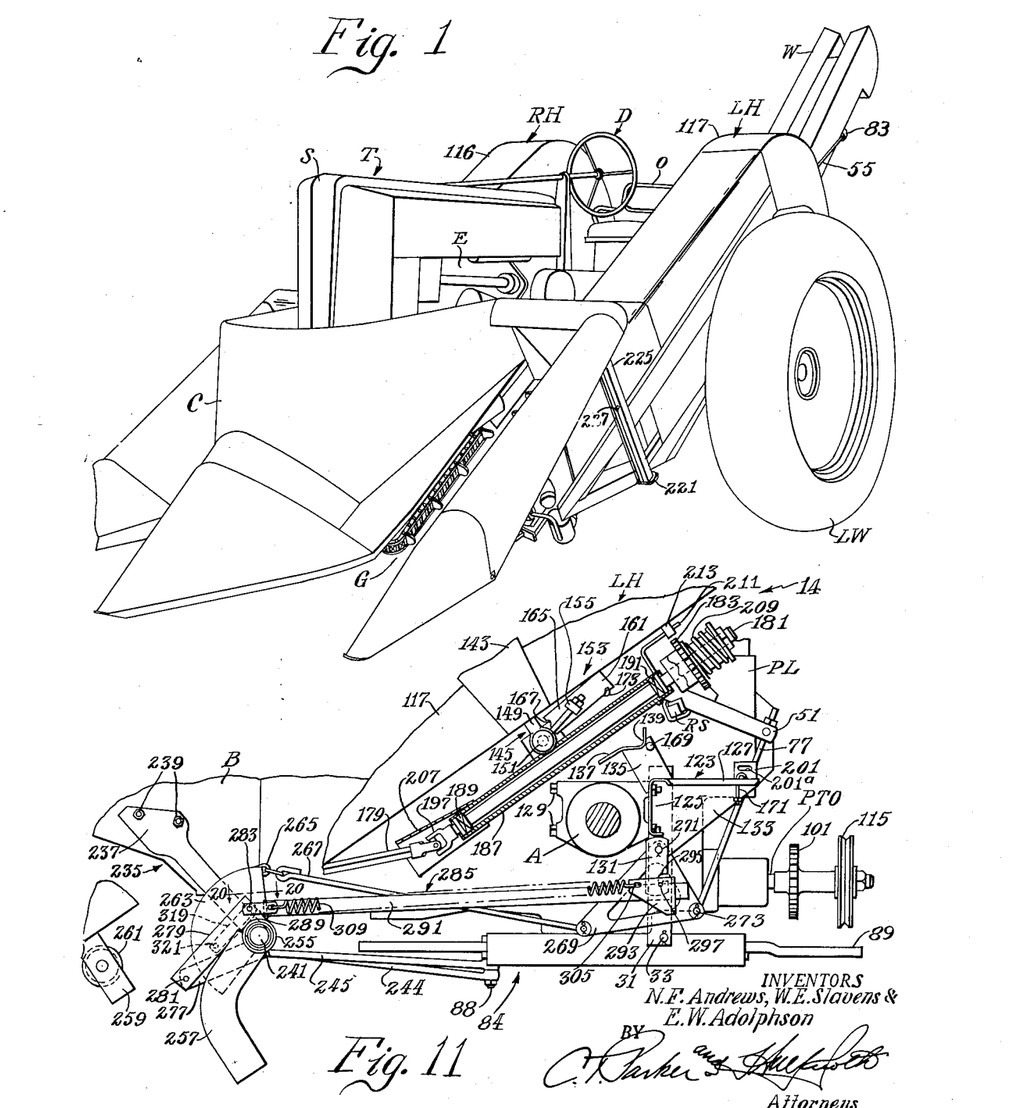
Figure 1 is a perspective view of a two-row tractor-mounted corn picker.
Figure 11 is a fragmentary view, partly in section, showing what is involved in mounting and dismounting the harvesting units on and from the tractor, the plane of the view as regards the tractor being indicated by the line 11—11 in Figure 4.

The supporting structure 123 may comprise a bracket having a vertical portion 125 and a horizontal portion 127. The vertical portion may be in the form of a web that is secured to the axle structure A by suitable securing means such as a plurality of bolts 129 (Figure 11). The vertical portion 125 depends from the axle structure A to provide a support 131 at a relatively low level and this lower support is braced to the horizontal portion 127 by a suitable web or gusset 133.

Rising from a forward portion of the support means 123 and rigid therewith is a support 135 having its upper part in the form of a forwardly and downwardly inclined ramp 137 which leads to abutment means forming a pocket or equivalent receiving structure 139. It is this pocket that forms the basic part of the supporting structure by means of which the left-hand unit LH is pivotally carried on the tractor. It will be understood, of course, that a similar arrangement is present at the other side of the tractor for the right-hand unit. Of course, if only a one-row machine is designed, only one such supporting means will be utilized.

The elevator or conveyor housing 117 of the left-hand unit LH is appropriately reenforced adjacent its upper end by inner and outer side members 141 and 143 in order to carry a U-shaped mounting means designated generally by the numeral 145. This mounting means includes a pair of generally upright legs 147 and 149 and a transverse horizontal pivot member 151. The pivot member 151 is received by the pocket 139 in the support means 135 and when locked in place, by means to be presently described, the cooperating structure provides a pivot on a transverse horizontal axis so that the left-hand unit LH may move vertically relative to the tractor as mentioned above.

Figure 12:
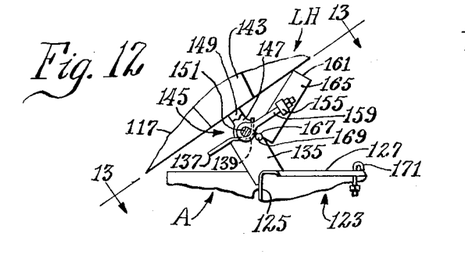
Figure 12 is a fragmentary elevational view showing more of the detail of the means for locking the harvesting unit to its pivotal support on the tractor.

Over-center or toggle locking means, designated generally by the numeral 153, is utilized to establish an operative releasable connection between the supporting means 123—145 for the left-hand unit. Similar means 152 is effective for the right-hand unit. The toggle means 153 comprises a transverse pivot member 155 which parallels the pivot member 151 and which is connected to that pivot member by means of a pair of arms in the form of eye bolts 157 and 159. The eyes of the eyebolts, respectively, receive the opposite ends of the pivot member 151 and opposite ends of the member 155 are apertured to receive the shanks of the eyebolts. A locking member in the form of a bail 161 has transversely spaced apart front ends or apertured legs 163 and 165 which respectively receive opposite end portions of the transverse member 155. The member 155 is essentially cylindrical so that the bail 161 is freely swingable thereon; however, opposite ends of the member are flattened so that they can be appropriately drilled to receive the shanks of the eyebolts 157 and 159. The free end of each leg of the bail 161 is notched, as shown at 167 for the leg 165 in Figures 11 and 12. The notched ends of the legs 163 and 165 are engageable with a transverse bar 169 rigid on the support means 135 directly behind the pocket 139. Thus, when the pivot member 151 of the mounting means 145 is received in the pocket 139, the notched ends of the bail legs 163 and 165 may engage the bar 169 as shown in Figure 12. The bail 161 may then be swung downwardly to a locked or retained position (Figure 4, for example), in which position it lies on top of the horizontal portion 127 of the supporting structure 123, being retained in that position by any appropriate means, such as a hook bolt 171 which engages its bight or rear end. Corresponding structure is provided at the right-hand side of the tractor axle structure A, a right-hand bail 160 being locked in place to the supporting structure 122 by means of a hook bolt 170 (Figure 4).

When the left-hand unit is dismounted from the tractor, the bail 161 is retained in an upper position by a hook bolt 173 (Figure 11) so that it will not interfere with mounting of the unit. A similar retainer 172 is provided for the right-hand unit (Figure 4).

The drivable parts of the units RH and LH derive power from the tractor power take-off shaft PTO. As best shown in Figure 9, parts of the driving mechanisms for the right- and left-hand units are designated generally and respectively by the numerals 174 and 175. These mechanisms respectively have input members or shafts 176 and 177. The input shaft 176 is connected by a longitudinally extending telescoping shaft means 178 ultimately connected at its rear end to a shaft 180 on which is keyed a chain sprocket 182. A similar telescoping shaft 179 connects the input shaft 177 for the left-hand mechanism 175 to a shaft 181 on which is keyed a driving sprocket 183. The chain 100, previously described as transmitting power from the power take-off shaft sprocket 101 to the wagon elevator drive, is so arranged as to be trained also about the sprockets 182 and 183. An idler sprocket 184 is adjustably carried in a bracket 186 on the right-hand supporting structure 122 and performs the conventional chain-tightening function.

The details of the driving mechanism for the left-hand unit are shown in Figure 11. The right-hand driving mechanism is, of course, the same or at least symmetrical.

The shaft 181 comprises a rotatable driving member journaled in a longitudinal tubular support 187 by any suitable means, as by a pair of anti-friction bearings 189 and 191. The support 187 is carried by bearing means coaxial with the mounting member 151 of the mounting means 145. For this purpose, the mounting member 151 includes a coaxial extension 193 and the tubular member 187 carries rigid thereon a bracket 195 in the form of a tunnel having alined slots 195ª through which the extension 193 passes. The tubular member 187 and its components thus comprise carrier means for journaling the shaft 181, and the slots permit fore-and-aft adjustment of the carrier to take care of alinement of the sprocket 183 with the PTO sprocket 101. In different types of tractors, the fore-and-aft location of the PTO may vary, especially if there are material changes in the PTO housing as might result from the use of a so-called live power take-off shaft. Because of the telescoping shaft means 179 and a universal joint 197, the shaft carrier 187 and the shaft 181 may pivot relative to the elevator housing 117 about the same pivot as that about which the unit pivots relative to the tractor. This arrangement is important for at least two reasons. First, when the left-hand unit is mounted on the tractor, the carrier is rigidly but releasably secured to the supporting means 123 and thus occupies the horizontal position of Figure 3 rather than the inclined position of Figure 11. The operating position of the tubular carrier 187 appears also in Figures 2 and 4.

The manner in which the tubular carrier 187 is locked or releasably retained in operating position is best shown in Figure 15, wherein it will be seen that the tubular member 187 has a retaining bracket 199 projecting laterally inwardly from one side thereof adjacent its rear end. A cooperative bracket in the form of an angle 201 is rigid on the horizontal portion 127 of the supporting means 123 and has a longitudinal slot 201ª therein. A bolt and nut assembly 203 passes through this slot and provides releasable means for securing the bracket 199 to the angle 201, at the same time enabling fore-and-aft adjustment of the carrier tube 187. Since the mounting means 145 is retained in position on the supporting means 135 by the toggle or over-center means 153, the left-hand unit is pivotally secured in position. The extension 193 on the pivot member 151 and the cooperative locking means 199—203 comprise a pair of means spaced apart lengthwise of the tubular member 187 for retaining this member rigidly in operating position. Since the extension 193 and the pivot member 151 are coaxial, the left-hand unit may pivot relative to the tubular member or carrier 187. This relative movement is, of course, accommodated by the telescoping shafting 179 and the universal joint 197. A second universal joint 205 may conventionally be provided between the shaft 179 and the input shaft or member 177.

Similar components appear at the right-hand side of the machine and these are designated in the drawings, according to the pattern followed herein, by even reference numerals, and it is deemed unnecessary to include further specific description.

As shown in Figure 11, the universal joint 197 may be appropriately shielded at 207. A conventional slip clutch 209 may be used between the rear end of the shaft 181 and its sprocket 183.

Figure 11 illustrates the relative positions of the left-hand unit LH, and its components, and the tractor rear axle structure A just prior to mounting of the former on the latter. It will be seen that the pivot member 151 is in horizontal alinement with and just forwardly of the pocket 139 in the receiving or supporting means 135. It will be noted also that the shaft carrier or tubular member 187 is retained in an upwardly inclining position. This result is accomplished by the provision on the rear end of the tubular member 187 of a retaining member 211 which is cooperative with a retaining member 213 carried by an under portion of the left-hand unit elevator housing 117 (see also Figure 14). The retaining member 211 in the present instance serves also as a shield for overlying the sprocket 183. An outer edge portion of this member is apertured at 215 (Figure 14) to be received and retained by the member 213 on the elevator housing 117. This member comprises a pair of biased elements, preferably constructed of spring steel, one of which is shaped at 217 as shown in Figure 14. When the shaft carrier or tubular member 187 is swung to the upwardly inclining position of Figure 11, the spring element 217 passes through the aperture 215 in the member 211. The parts are so designed that the means 213—215 is capable of releasably retaining the shaft carrier or tubular member 187 in what might be termed its inoperative position. Release of this means 211—213 may be easily effected manually just prior to acceptance of the pivot member 151 by the pocket 139. On the other hand, the release may be accomplished automatically by the mere act of moving the tractor forwardly relative to the dismounted unit LH. It will be seen in Figure 11 that the inclination and length of the tubular member 187 are such that its lower or forward end serves as a shaft guard ahead of or in the path of the tractor axle structure A. Thus the axle structure engages the member 187 at a point on the former below the pivot axis 151—193 and as the tractor moves forwardly relative to the dismounted unit LH, the axle housing strikes the tubular member 187 and the force is sufficient to cause release of the means 211—213.

Because of the lengthwise spaced apart sustaining means 193—195 and 199—201, the tubular member 187 adds strength to the mounting of the left-hand unit and complements the support at 139—151. At the same time, the tubular member 187 houses or carries the shaft 181. Consistent with the idea of integrating the attaching and detaching components, the shaft carrier or tubular member 187 and many of its components remain with the left-hand unit when this unit is removed from the tractor, all of which is accomplished without unduly complicating either the tractor or the unit.

Figure 8:
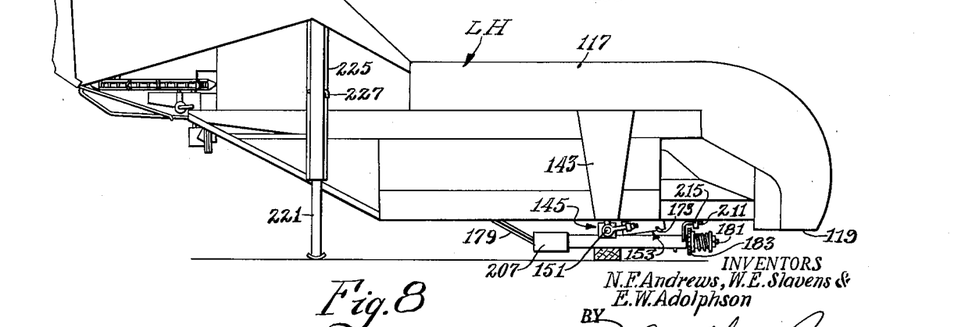
Figure 8 is a side elevational view showing a preferred ground-supported position of one of the removed harvesting units.

Figure 1 shows in full lines the mounted position of the left-hand unit on the tractor. Figure 8 shows the dismounted position of the left-hand unit and Figure 9 shows the dismounted positions of both units. The dismounted position of either unit (or both together, if both are used) has two phases, as will be presently explained. In order that the left-hand unit may be adequately supported in its dismounted position, it is provided with a pair of supporting legs 219 and 221. These are located respectively at the inner and outer sides of a forward portion of the unit. The inner leg 219 is slidably received in pocket structure 223 and similar pocket structure 225 receives the outer leg 221. Figure 10 shows the detail structure involved for the leg 221 and pocket structure 225. The pocket structure is hollow and is apertured to receive a retaining pin 227. The leg 221 has a pair of spaced apertures 229 and 231, either of which may be registered with the aperture in the pocket structure to receive the pin 227. When the leg 221 is in its retracted position during operation of the machine, the pin 227 passes through the lower aperture 229. When the leg 221 is extended, as shown in dotted lines in Figure 3 and in full lines in Figures 8 and 9, the pin 227 passes through the upper aperture 231. The arrangement at the opposite side of the unit is the same and a retaining pin 233 is visible in Figure 9 for the inner leg 219 and inner pocket structure 223. The right-hand unit also has a pair of legs, only one of which is visible at 218 in Figure 9. This leg as well as the other leg (not shown) cooperates with pocket structure similar to those described for the left-hand unit. The inner pocket structure for the right-hand unit is designated by the numeral 222 and a retaining pin 232 is visible in that figure.

Before the units are dismounted from the tractor, they are adjusted so that the forward portions thereof are clear of the ground as shown in Figure 3. The legs are extended (dotted lines in Figure 3) into contact with the ground and the necessary tractor-picker connections are released. It is a feature of the invention that the leg-ground contact is slightly behind the center of gravity of the unit, and when release is effected at 139—145 the unit will tilt forwardly about the legs as a fulcrum and the structure 145 will clear the pocket structure 139 so that the tractor may be driven rearwardly and the units left standing. The location of the legs relative to the center of balance of the units is such that the units may be left standing, as suggested in Figure 3, or may be tilted rearwardly, as shown in Figure 8. The location of the legs, plus the relatively light weight of the units, makes it possible for one man to accomplish either of these positions. Whether one position or the other is used depends largely upon circumstances. For example, in transporting the assembled units on freight cars, it may be found more expedient to use the position of Figure 8, whereas the position of Figure 3 may lend itself more readily to storage on the farm.

In addition to the supporting structures 122 and 123, the tractor is equipped with additional supporting structure for carrying and adjusting the units RH and LH relative to the tractor. The additional supporting means is best illustrated in Figure 16 as comprising right- and left-hand supports 234 and 235 adequately cross-braced and braced additionally to the tractor drawbar structure 84. The right-hand support is L-shaped and has a generally upright leg 236 secured by a pair of cap screws 238 to one side of the tractor body B. In addition, the right-hand support includes a horizontal, laterally outwardly extending leg in the form of a pivot shaft 240. The left-hand support is symmetrically constructed and has legs 237 and 241, the leg 237 being secured to the opposite side of the body B by cap screws 239.

The supports 234 and 235 are cross-braced by a tie rod 242 and are braced longitudinally relative to the tractor rear axle structure A by a pair of truss braces 244 and 245. The rear ends of the truss braces 244 and 245 may be formed as eyes to receive the pivot bolt 88 in the drawbar 84. Thus, these braces converge rearwardly to the drawbar structure and by means of the drawbar structure are secured or fixed to the tractor body in longitudinally spaced relation to the mounting of the supports 234 and 235 at a portion of the body intermediate the traction wheels LW and RW and the front wheel truck FW. Opposite ends of the tie rod or cross brace 242 are formed as eyes 246 and 247 respectively so that threaded forward ends of the truss rods 244 and 245 may pass therethrough and through securing elements provided on the supports respectively at the junctions of the upright and horizontal legs thereof. A representative structure is depicted in Figure 17, wherein the left-hand support 235 is shown as having rigidly secured thereto at the elbow or junction of the legs 237 and 241 a collar or eye member 249. A similar member 248 is provided at the elbow of the legs 236 and 240 of the right-hand support 234. A nut 250 is threaded on the forward end of the truss rod 244 behind the eye 246 of the tie rod 242 and a second nut 254 completes the assembly. Nuts 251 and 253 serve a similar purpose at the left-hand support 235. By means of the nuts just described, the truss rods or braces 244 and 245 are operative not only to rigidify the supports 234 and 235 but function in tension or compression to aline the shaft portions 240 and 241 so that they will be coaxial in a transverse upright plane. The tie brace 242 is adjustable along its length in response to adjustment of the truss braces so as to level or otherwise modify the angle of each shaft portion 240, 241 relative to the horizontal.

In general, the coaxial shaft portions 240 and 241 provide means on which is mounted tilting mechanism for adjusting the units relative to the tractor. Since the tilting mechanism for the left-hand unit is illustrated in detail, the description will be limited thereto, it being understood, as before, that the right-hand mechanism is similar. Again, to the extent that the right-hand components are visible, they will bear even reference numerals. The description of the left-hand mechanism will proceed with the use of uneven numerals.

A sleeve 255 is rockable on the left-hand shaft portion 241 and has rigid therewith a forwardly and downwardly extending adjusting or tilting arm 257. The inner side of the left-hand unit carries a bifurcated bracket 259 within which is journaled a roller 261. When the left-hand unit is mounted on the tractor, the roller 261 is in position to be engaged by the upwardly moving arm 257. This arm fits between the furcations of the bifurcated member 259 for the purpose of giving the units lateral stability relative to the tractor. In Figure 11, as described above, the left-hand unit is offset forwardly from the tractor to illustrate the position it occupies just prior to the mounting thereof on the tractor. It will thus be understood that the roller 261 will move from the position of Figure 11 to that illustrated in dotted lines in Figure 3. Thus, as the arm 257 is rocked in a clockwise direction as viewed in Figures 3 and 11, the left-hand unit will be raised, pivoting about its pivot at 151. The weight of the unit will cause it to lower by gravity upon relaxation of the means utilized to effect the raising, which means will be described in detail below.

Figure 9 illustrates a bifurcated member 258 for the right-hand unit, which member carries a roller (not shown) similar to the roller 261 for cooperation with an arm similar to the arm 257.

Rigid with the sleeve 255 and arm 257 is a sector 263 to which is anchored one end of a lifting chain 265. The other end of the chain 265 is connected to the forward end of a longitudinally rearwardly extending, force-transmitting means or lifting link 267 and the rear end of the link is connected to one arm of a triangular bell crank or intermediary element 269 which forms part of the lifting or adjusting means for the units. This bell crank is pivoted at 271 on the depending supporting portion 131 of the left-hand supporting structure 123. The other arm of the bell crank 269 is connected by a removable pin 273 to the apertured end or eye 79 of the force-transmitting means or lifting link 77 previously described in connection with the wagon elevator (Figure 6, for example). As shown in Figure 4, the pivot pin 271 for the bell crank 269 is supported in part by the depending supporting portion 131 and in part by the upright bracket 31 that is utilized for mounting the wagon elevator. A similar construction is involved at the right-hand side, wherein a bell crank 268 is pivoted on a pivot pin 270.

From the description thus far, it will be seen that the power lift PL is utilized by means of the rockshaft RS and lifting arms 50 and 51 to raise and lower the units about the coaxial pivot members 150 and 151, the power lift operating through the lifting links 76 and 77, bell cranks 268 and 269 and the lifting arms carried on the coaxial shaft portions 240 and 241 of the right- and left-hand intermediate supporting structures 234 and 235. Of course, when the power lift means is utilized in the mounting of the wagon elevator as described above in connection with Figure 6, the lifting links 76 and 77 must be disconnected from the bell cranks 268 and 269. For this reason, the connection at 273 for the left-hand unit (and a similar connection 272 for the right-hand unit) is made removable. There is also involved in the dual functioning of the power lift means for the purpose of mounting and dismounting the various units, the requirement that the bell cranks 268 and 269 be momentarily immobilized, since, as will appear below, counterbalance or assist spring means is utilized in conjunction with the power lift means. To this end, then, the right- and left-hand rear axle supports 30 and 31 respectively carry releasable means in the form of transversely shiftable locking pins 274 and 275 (Figure 4). These pins are normally inwardly retracted so as not to interfere with rocking of the bell cranks 268 and 269. As best shown in Figure 6, the pin 275 may be shifted to the left after the bell crank 269 has been rocked to substantially its maximum position in a counterclockwise direction. Thus, the bell crank 269 is held stationary and the operator can then remove the pin 273 between the bell crank 269 and lifting link 277, making the lifting link 77 available for use with the wagon elevator.

When the units RH and LH are removed from the tractor, it is not necessary to effect a disconnection between the lifting links 76 and 77 and the bell cranks 268 and 269, since the units separate from the tractor at the horizontal transverse pivot 150—151 and also from the lifting arm 257 at the left-hand side of the tractor and that not shown at the right-hand side of the tractor. In the latter respect, the absence of a positive connection between the lifting arms and the units facilitates the separation just referred to. In short, all of the tilting means with the exception of the roller 261 at the left-hand side of the machine and the similar roller (not shown) at the right-hand side of the machine, remain with the tractor.

The sleeve 255 that is journaled on the supporting shaft 241 at the left-hand side of the tractor has rigid thereon, in addition to the tilting or lifting arm 257, a forwardly extending arm 277. A rearwardly extending link 279 is pivoted at 281 to the forward end of the arm 277 and has its rearward end connected by a pivot pin 283 to the forward end of counterbalance or assist means designated generally by the numeral 285.

Figure 18:
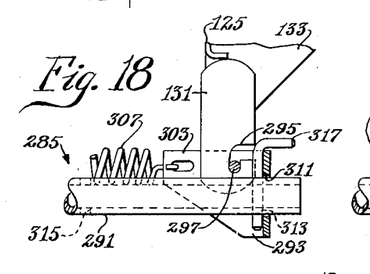
Figure 18 is an enlarged fragmentary sectional view as seen along the line 18—18 of Figure 4.
Figure 20:
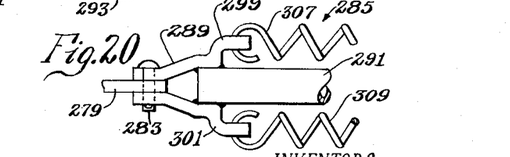
Figure 20 is a fragmentary plan view as viewed along the line 20—20 of Figure 11.

As best shown in Figure 20, the forward end of the counterbalance means includes a bifurcated bracket 289 forming part of the connection at 283. This bracket is welded or otherwise secured to the forward end of a longitudinally extending strut 291, the rear end of which is longitudinally slidably carried in a bracket or support 293 (Figure 18). The supporting part 131 has a downwardly angled slot 295 within which a cross pin 297 in the bracket 293 is received. Normally, the bracket 293 becomes part of the support 131; although, the two are disengageable, in a manner to be presently described.

The bifurcated connection at 289 between the link 279 and the strut 291 includes inner and outer attaching clips 299 and 301 which are respectively in longitudinal alinement with the forward side portions of the bracket 293, which is U-shaped to provide legs at 303 (Figure 18) and 305 (Figure 11). Inner and outer counterbalance or assist springs 307 and 309 are connected respectively at opposite ends to the clips 299 and 301 and legs 303 and 305 of the bracket 293. The rear transverse portion of the bracket 293 is apertured at 311 to permit the longitudinal sliding movement of the strut 291, as previously indicated. Thus, during normal operation, the springs 307 and 309 act between the bracket 293 (which is in effect a part of the tractor) and the linkage 289—279 to exert a force tending to rock the lifting sleeve 255 in a clockwise direction about its supporting shaft member 241. In short, the counterbalance or assist force operates in such direction as to assist the power lift in the raising of the units relative to the tractor. This is the situation that will be obtained when the units are arranged as shown in Figure 3; and also as is suggested in Figure 11, with the exception, of course, that the unit LH is not quite in its mounted position. Nevertheless, the function of the counterbalancing springs 307 and 309 is illustrated, but the effect thereof is nullified momentarily because the power lift PL is hydraulically locked against the action of the springs.

Since the counterbalance or assist means are parts of the tractor, they need not be disconnected when the units RH and LH are dismounted. However, since the tractor may be used with other machines in which the counterbalance means are not necessary, it is desirable to make provision for detaching the counterbalance means from the tractor.

Figure 19:
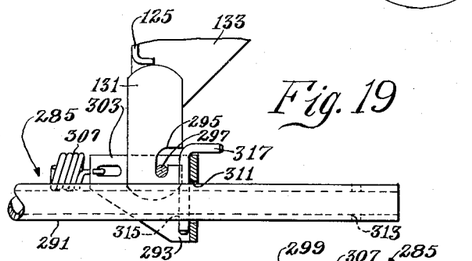
Figure 19 is a view similar to Figure 18 but showing the parts in different positions.

Figures 18 and 19 show that the strut 291 is provided adjacent its rear end with a vertical opening 313 and with a second opening 315 spaced a distance forwardly of the rear end of the strut. A temporary locking or retaining means in the form of a removable pin 317 may be selectively inserted into one or the other of the apertures 313 or 315 to facilitate mounting and dismounting of the counterbalance means. Normally, this pin is carried elsewhere on the tractor and is free from the strut, as will appear in Figures 3 and 11. Thus, the strut is normally free to slide longitudinally relative to the fixed bracket 293 and the load of the spring is taken on the transverse connecting pin 297 that connects the bracket 293 to the supporting part 131. Since the slot 295 opens upwardly and rearwardly, the tension of the springs 307 and 309 will prevent accidental disconnection of the pin 297 from the slot 295.

When it is desired to disconnect the counterbalance means from the tractor, preferably with the units in their mounted positions, the power lift means PL is actuated to obtain variations in length and load on the springs 307 and 309 to facilitate the transferring of the load of the springs from the cross pin 297 to the now inserted upright pin 317.

Dismounting of the counterbalance device or means 285 may be accomplished as follows: The power lift PL is actuated so that the rockshaft RS is caused to move in a clockwise direction. The weight of the left-hand unit, acting through the roller 261 on the tilting arm 257, will cause rocking of the arm 257 and its sleeve in a counterclockwise direction. This will be followed by forward movement of the strut 291 and by stretching of the springs 307 and 309. When the rear aperture 313 in the strut 291 is ahead of the transverse portion of the bracket 293, the pin 317 is inserted as shown in Figure 18. The load of the springs 307 and 309 is now transferred from the cross pin 297 to the inserted pin 317. The power lift may then be actuated to rock the rockshaft RS in a counterclockwise direction and the operator may at the same time lift upwardly on the rear end of the strut 291 so that the cross pin 297 is alined with the horizontal portion of the slot 295. The power lift may be continued in operation until the cross pin 297 clears the supporting part 131, after which the entire counterbalancing means may be dropped downwardly about its pivotal connection 283 with the link 279. This is possible, because the strut 291 is a compression member as well as a tension member. If it is desired that the disconnection be effected at 283 rather than at 297, the same sequence of movement may take place, with the exception that the disconnection is not effected at 297. As soon as load is taken off the pin 283, it may be re-moved and the counterbalance means subsequently disconnected at 297. In either case, the important thing is that the springs 307 and 309 act against the strut, which is now pinned to the bracket 293 by means of the pin 317.

Figure 19 shows another phase of operation concerning the counterbalance means 285. In this situation, the forward hole 315 in the strut receives the pin 317 ahead of the cross portion of the bracket 293. This position of the parts is achieved by causing rocking of the tilting sleeve 255 and its arm 257 to its substantially maximum position in a clockwise direction. The springs 307 and 309 will be considerably relaxed over what they are in Figure 18. Again, disconnection may be effected at either 283 or 297. Again, the pin 317 transfers the load of the springs 307 and 309 to the strut 291 from the cross pin 297. At this time, the disconnection is effected at 283 and the pin 283 is removed from between 289 and 279. The tilting sleeve 255 and its arm 257 are then caused to rock in a counterclockwise direction for a distance equal to the length of a storage link 319. This link is normally carried in the position shown in Figure 11, with its rear end connected, for convenience, by means of the pin 283 to the link 279. When the storage link is used, the pin 283 is withdrawn so as to disconnect both it and the connection 289 from the link 279, after which the pin 283 is inserted between only the storage link and the connection 289. The storage link has at its forward end an aperture 321 which, when alined with the aperture in the link 279 from which the pin 283 has been removed, is adapted to receive an additional connecting pin. Thus, the distance between the forward end of the strut 291 (and likewise its rearward end) and the rear end of the link 279 is increased by the length of the storage link 319. The pin 317 is then removed from the aperture 315 in the strut 291 and the power lift means actuated to again rock the lifting sleeve 255 and its arm 257 in a counterclockwise direction. Consequently, the distance between each attaching clip 299, 301 and each leg portion 303, 305 of the bracket 293 is decreased by the length of the storage link 319. The decreased distance available is shorter than the free length of either of the springs 307 and 309 and neither spring will at this time exert any tension between the connection 289 and the bracket 293. Therefore, the springs may be removed and replaced with other springs if desired, after which the foregoing procedure is reversed and the new spring or springs loaded to normal operating capacity. That is to say, the tilting sleeve 255 and its arm 257 are caused to be rocked in a counterclockwise direction by the weight of the left-hand unit and the strut 291 is thus moved forwardly until the forward aperture 315 in the strut is just ahead of the transverse portion of the bracket 293 so as to again receive the pin 317. The load of the partly stretched springs is now taken directly on the strut, which enables the operator to remove the storage link 219 and replace it in the position shown in Figure 11, effecting a connection with the pin 283 between the rear end of the link 279 and the connecting means 289. It will be understood that in this operation the tilting sleeve 255 and its arm 257 are rocked as desired so as to permit easy removal and reinstallation of the pin. Then the pin 317 is removed and the machine is ready for normal operation so far as concerns the functioning of the counterbalance device.

The same arrangement and sequence of operation are available at the right-hand side of the machine. A bracket 292 corresponding to the bracket 293 is illustrated, as is a strut 290 which corresponds to the left-hand strut 291.

Although the sequence of operations in the mounting and dismounting of the various units to and from the tractor has been covered above, it may be desirable to outline briefly some of the fundamental concepts involved. First of all is the idea of making it as simple and inexpensive as possible to utilize a two-row machine, plus a wagon elevator unit, with a tractor of conventional design. This is accomplished by providing attaching structure which obviates the need for permanently modifying the tractor or other vehicle on which the agricultural units are to be mounted. Not only is the attaching structure readily usable with the units RH, LH and W, for example, but this structure is readily detachable from or mountable on the tractor. Thus, when the tractor is completely stripped of all the components used in the mounting of the units RH, LH and W, the various components are conveniently grouped for easy reattachment. In many instances, it may be necessary only to remove the units RH, LH and W without disturbing the tractor-mounted mechanism and the counterbalance means or device. In such case, the tractor may be driven to an area in which it is convenient to store the removed units RH and LH as cross-connected by the central divider C (Figure 9). With the power lift mechanism actuated so that the forward portions of the units rest on the ground, the supporting legs (such as 218 and 219) are dropped to their ground-engaging positions and pinned in place by the pins 232 and 233. The hook bolts 170 and 171 are released from the toggle means 152 and 153 and the bails 160 and 161 are swung to their upward position and releasably retained by the hook bolts that depend from the underside of the elevator housings 116 and 117 of the right- and left-hand units RH and LH, respectively, as suggested at 173 in Figure 11. The bolt 203 (Figure 15) is removed from between the angle 201 and bracket 199 on the shaft carrier or tubular member 187 and the carrier is swung to its retained position as in Figure 14. A similar result is accomplished, of course, for the right-hand unit RH. Since the bifurcated roller-supporting means 258 and 259 are disengageable from the lifting arm in a fore-and-aft direction, the tractor may be readily driven rearwardly out from between the now ground-supported and tractor-disconnected units RH and LH.

The operator may then dismount the wagon elevator W in any convenient position, depending upon how he cares to maneuver the tractor. For example, he may drop the wagon elevator directly rearwardly of the demounted units RH and LH, leaving only sufficient room to drive the tractor out from between the spaced units. Or he may turn the tractor around and dismount the wagon elevator alongside the dismounted units RH and LH. In either event, the sequence of operation will be substantially the same. First, the power lift is actuated to rock the rockshaft RS in a counterclockwise direction, thus causing similar rocking of the bell cranks 268 and 269. The bell-crank-locking pins 274 and 275 are then shifted respectively laterally outwardly ahead of the bell cranks, as indicated in Figure 6, after which the disconnection may be effected between the lifting links 76 and 77 and the bell cranks 268 and 269. The lower ends of the lifting links 76 and 77 are then connected to the intermediate holes or apertures in the wagon-elevator-supporting links 66 and 67. Disconnections are effected between the upper ends of the links 66 and 67 and the upper ends of the axle-carried brackets or supports 30 and 31. The pins or bolts 96 are removed from the trailer hitch 92 so that the hitch may be removed from the drawbar member 89. Here, as in the dismounting of the units RH and LH, it is assumed that the driving chain 100 and driving belt 112 will have been previously disconnected.

The power lift is now operated to lower the wagon elevator and its frame 34 about the coaxial pivots 32 and 33 to a position in which at least the boot or lower end of the wagon elevator is supported on the ground, as shown in Figure 5. As previously described, the wagon elevator may or may not be supported in this position by the use of an appropriate support. Instead, the wagon elevator may occupy the horizontal position indicated in Figure 6. In any event, as soon as a stable ground-supported position is secured, the readily removable pins (such as 43) may be withdrawn from the pivotal connections 32—38 and 33—39. The tractor may then be driven forwardly and is now free from all of the units that it previously carried.

Various other features of the invention, not specifically enumerated herein, will undoubtedly suggest themselves to those versed in the art, as will numerous equivalents of the components of the preferred embodiment of the invention disclosed, all of which may be achieved without departing from the spirit and scope of the invention.

What is claimed is:

1. For use with a tractor having a longitudinal body carried on a transverse axle structure and including a longitudinal power take-off shaft rearwardly of the axle structure: a harvester row unit of elongated construction, positionable lengthwise of the tractor body and including a fore part ahead of the tractor axle structure and a rear part positionable in vertically spaced relation to and substantially directly over the tractor axle structure; harvesting mechanism carried by a fore part of the row unit and having a longitudinal input shaft terminating in a rear end portion ahead of and below the level of the tractor axle structure; means for connecting the row unit to the tractor, including a mounting element having leg means secured to and depending from the rear part of said row unit and transverse pivot means on the lower end of the leg means positionable proximate and parallel to the tractor axle structure, said pivot means being disconnectibly securable to the tractor axle structure above the level of the rear end portion of the input shaft and providing a pivot on a transverse axis about which the row unit can have tilting movement relative to the tractor; a longitudinal drive shaft alongside the row unit and having a front end proximate to the rear end portion of the aforesaid input shaft and a rear end substantially transversely alinable with the tractor power take-off shaft; a support connected to the mounting element substantially as a coaxial extension of the transverse pivot means and projecting in proximity to the drive shaft; a shaft carrier having a bearing on a longitudinal axis and rotatably carrying the drive shaft, and further being pivoted on the support for upward and downward rocking thereof with the drive shaft and shaft carrier about said transverse pivot axis; flexible and longitudinally telescopic drive means interconnecting the front end of the drive shaft to the rear end portion of the input shaft to accommodate rocking of the drive shaft; means on the shaft carrier for disconnectibly fixing said shaft carrier to the tractor axle structure; and means on the rear end of the drive shaft affording a power-receiving connection to the tractor power take-off shaft.

2. A row unit as defined in claim 1, in which: the pivoting of the shaft carrier on the support and the telescopic drive connection are such as to enable the rear end portion of the drive shaft to be rocked upwardly clear of the tractor axle structure and into proximity to the rear under part of the row unit; and said rear under part of the row unit has releasable lock means operative to support the drive shaft in said upwardly rocked position.

3. A row unit as defined in claim 1, including: means for supporting the row unit, when detached from the tractor, in a position in which said transverse pivot means is substantially at a level to be received by the tractor axle structure upon driving of the tractor forwardly relative to the row unit; the drive shaft is rockable upwardly about its transverse pivot axis to assume a forwardly and downwardly inclined position so that its rear portion lies proximate to the rear under part of the row unit and its forward portion lies consequently in the path of forward movement of the tractor axle structure relative to the row unit; means for releasably securing the drive shaft in said inclined position; and guard means at a forward portion of the drive shaft in said path of the tractor axle structure to be engaged by the tractor axle structure upon forward relative movement thereof, said releasable means being effective to hold the drive shaft in said inclined position but operative to release the drive shaft in response to forces created by engagement of the tractor axle structure with said guard means.

4. Mounting means of the drive-in drive-out type for detachably supporting an agricultural machine on a tractor, wherein the tractor has a longitudinal body and a transverse rear axle structure and the machine is positionable ahead of the rear axle structure, comprising: an axle-structure-carried support including a forwardly and downwardly directed ramp having at its rear end an upright abutment forming with the ramp a transverse pocket; a machine-carried mounting element including a transverse member positionable normally at a level to be engaged by and to ride up the ramp for receipt by said pocket upon forward movement of the tractor relative to the machine; said transverse member having opposite ends projecting respectively at opposite sides of the ramp and affording coaxial pivots; a pair of arms pivoted respectively to said pivots and of such length that their free ends extend rearwardly of said abutment when the transverse member is received by the ramp; a lock member having front and rear ends and a transverse pivot intermediate said ends and connected to the free ends of the arms on an axis parallel to the coaxial pivots, said lock member forming with said arms a selectively lockable and releasable toggle, said front ends of the lock member being engageable with the support behind the abutment so that downward movement of the rear end of said lock member effectuates said toggle to lock the transverse member in said pocket; and means releasably cooperative between the support and the toggle for holding the toggle in locking position.

5. Mounting means as defined in claim 4, in which: the lock member and the machine have cooperative retaining elements effective to hold the lock member upwardly and clear of the ramp when the toggle is released.

6. Mounting means as defined in claim 4, in which one of the ends of the transverse member is longer than the other; a shaft carrier is mounted on said longer extension for rocking about said transverse axis between an up position when the machine is detached and a down position when attached; and means is releasably cooperative between the shaft carrier and the support for securing the shaft carrier fixedly to the support.

7. Mounting means as defined in claim 6, in which; the shaft carrier and the machine have cooperative retaining elements effective to hold the shaft carrier in its up position and clear of the support.

8. For use with a tractor having a longitudinal body carried on a transverse axle structure and including a longitudinal power take-off shaft rearwardly of the axle structure: a harvester row unit of elongated construction, positionable lengthwise of the tractor body and ahead of the tractor axle strucure and including a rear part positionable adjacent to the tractor axle structure; harvesting mechanism carried by a fore part of the row unit and having a longitudinal input shaft terminating in a rear end portion ahead of the tractor axle structure; a mounting element for connecting the row unit to the tractor, including a transverse pivot means positionable proximate and parallel to the tractor axle structure, said pivot means being disconnectibly securable to the tractor axle structure and providing a pivot on a transverse axis about which the row unit can have tilting movement relative to the tractor; a longitudinal drive shaft alongside the row unit and having a front end proximate to the rear end portion of the aforesaid input shaft and a rear end substantially transversely alinable with the tractor power take-off shaft; a shaft carrier having a bearing on a longitudinal axis to rotatably carry the drive shaft, and further being pivoted on the transverse pivot means for upward and downward rocking thereof with the drive shaft about said pivot axis; flexible and longitudinally telescopic drive means interconnecting the front end of the drive shaft to the rear end portion of the input shaft to accommodate rocking of the drive shaft; means on the shaft carrier for disconnectibly fixing said shaft carrier to the tractor axle structure; and means on the rear end of the drive shaft affording a power-receiving connection to the tractor power take-off shaft.

9. For use with a tractor having a longitudinal body including a support and further including a power take-off member spaced longitudinally from said support: a harvester row unit having a mounting portion positionable adjacent to the tractor support, and further having harvesting mechanism including an input member spaced longitudinally from the tractor in the direction opposite from the power take-off member; a transverse pivot member on the row unit mounting portion for removable but fixed attachment to the tractor support and providing a pivot axis about which the row unit can tilt relative to the tractor; a longitudinal, hollow brace element alongside and pivotally carried by said row unit coaxially with the transverse pivot member, said element having a rigid portion in longitudinally spaced relation to the transverse pivot member and including provision for fixed but removable attachment to the tractor; and drive means extending longitudinally through the brace element and connected at one end to the harvesting means input member and connectible at its other end to the tractor power take-off member.

10. For use with an agricultural tractor having a power take-off member: an agricultural unit having a mounting portion positionable adjacent to the tractor to be detachably sustained thereby; means on the mounting portion affording removable attachment of the unit to the tractor, including a pivot providing for swinging of the unit relative to the tractor; drivable mechanism on the unit, including an input member; a rotatable drive shaft having one end portion flexibly connected to the input member and having its other end connectible to the tractor power take-off member; shaft carrier means supporting the drive shaft for rotation, including first and second supporting parts spaced axially of the drive shaft and fixed relative to each other, at least said second supporting part being in spaced relation to the aforesaid mounting pivot; means articulately mounting the shaft carrier means on the unit via said first supporting part for shifting of the drive shaft and shaft carrier means so that the second supporting part is movable selectively between a first position relatively remote from the tractor and a second position relatively close to the tractor; and means on the second supporting part affording removable affixation of said second supporting part, in its second position, to the tractor in spaced relation to the aforesaid mounting pivot.

11. For use with an agricultural tractor having a power take-off member: an agricultural unit positionable adjacent to the tractor and having a tractor-receivable mounting portion; drivable mechanism on the unit, including an input member; a shaft carrier; articulate means mounting the shaft carrier on the unit mounting portion for selective shifting of the shaft carrier relative to the unit between an inoperative position clear of the tractor and an operating position proximate to the tractor; a drive shaft journaled in the shaft carrier and having one end portion flexibly connected to the input shaft to accommodate position changes of the drive shaft and shaft carrier; means on the shaft carrier for removably but fixedly securing the shaft carrier to the tractor in its operating position, whereby the shaft carrier is rigid with the tractor and the unit is movable relative to both the tractor and the shaft carrier via the aforesaid articulate means; and means on the drive shaft affording connection thereof to the tractor power take-off member.

12. For use with an agricultural tractor having a power take-off member: an agricultural unit having a mounting portion positionable adjacent to the tractor and including drivable mechanism provided with an input member; a shaft carrier mounted on the unit mounting portion for swinging about a pivot axis between an inoperative position clear of the tractor and an operative position adjacent to the tractor; a drive shaft journaled on the shaft carrier for rotation therein and for swinging therewith; drive means for flexibly interconnecting the drive shaft and the input member irrespective of the position of the shaft carrier and drive shaft; means for rigidly affixing the shaft carrier in its operating position to the tractor and providing for swinging of the unit relative to the tractor and said fixed shaft carrier; and means affording a drive connection from the tractor power take-off member to the drive shaft.

13. For use with a mobile crop-harvesting machine that gathers crops during advance over a field and conveys such crops rearwardly for ultimate transfer to a trailer operated with the machine: a crop-handling attachment for receiving crops from the machine and for transferring the crops to the trailer, comprising: support means attachable to the rear of the machine and including a pair of pivots coaxially spaced apart on a transverse axis and a pair of transversely spaced apart and alined connecting elements at a level above that of the pivots; frame means of U-shaped construction having its legs extending forwardly and having forwardly opening portions to slip forwardly onto and to be sustained by the pivots with its bight spaced rearwardly of the pivots and adapted to be temporarily supported from the ground to dispose the frame means in a rearwardly and downwardly inclined position preparatory to being raised to a horizontal position; a trailer hitch element having at its forward end means for connection thereof to the machine to extend rearwardly as a laterally swingable cantilever and having vertically rigid therewith a rear bight-engaging portion, said hitch element having provision for shifting of the bight-engaging portion selectively from a first position, in which said portion is clear of the bight so as to allow raising of the frame means to its horizontal position, to a second position engaging the bight and sustaining the frame means temporarily in its horizontal position; a pair of attaching link means connectible between the frame means and the supporting means connecting element and of such length when thus connected as to relieve the hitch element of the weight of the frame means so that said element is laterally swingable as aforesaid; means for securing the bight-engaging portion of the hitch element against rearward separation relative to the machine; means on the hitch element for connection to the trailer; and means on the frame means for securing said frame means against rearward separation relative to the machine.

14. For use with a mobile crop-harvesting machine that gathers crops during advance over a field and conveys such crops rearwardly for ultimate transfer to a trailer operated with the machine: a crop-handling attachment for receiving crops from the machine and for transferring the crops to the trailer, comprising: support means attachable to the rear of the machine and including a pivot on a transverse axis and a connecting element at a level above that of the pivot; frame means having a fore-and-aft leg provided with a forward portion to engage and to be sustained by the pivot with its rear end portion spaced rearwardly of the pivots and adapted to be temporarily supported from the ground to dispose the frame means in a rearwardly and downwardly inclined position preparatory to being raised to a horizontal position; a trailer hitch element having at its forward end means for connection thereof to the machine to extend rearwardly as a cantilever and having vertically rigid therewith a rear portion engageable with the rear portion of the frame means, said hitch element having provision for shifting of its rear portion selectively from a first position, in which said portion is clear of the rear portion of the frame means so as to allow raising of the frame means to its horizontal position, to a second position engaging said rear portion of the frame means and sustaining the frame means in its horizontal position; an attaching link means connectible between the frame means and the supporting means connecting element and of such length when thus connected as to support at least part of the weight of the frame means; means for securing the rear portion of the hitch element against rearward separation relative to the machine; means on the hitch element for connection to the trailer; and means on the frame means for securing said frame means against rearward separation relative to the machine.

15. For use with a mobile crop-harvesting machine that gathers crops during advance over a field and conveys such crops rearwardly for ultimate transfer to a trailer operated with the machine: a crop-handling attachment for receiving crops from the machine, comprising: support means attachable to the rear of the machine and including a pivot on a transverse axis and a connecting element at a level spaced from that of the pivot; a frame having a fore-and-aft leg provided with a forward portion to engage and to be sustained by the pivot with its rear end portion spaced rearwardly of the pivots and adapted to be temporarily supported from the ground to dispose the frame in a rearwardly and downwardly inclined position preparatory to being raised to a horizontal position; a trailer hitch element having at its forward end means for connection thereof to the machine to extend rearwardly as a cantilever and having vertically rigid therewith a rear portion engageable with the rear portion of the frame, said hitch element having provision for shifting of its rear portion selectively from a first position, in which said portion is clear of the rear portion of the frame so as to allow raising of the frame to its horizontal position, to a second position engaging said rear portion of the frame and sustaining the elevator frame in its horizontal position; an attaching link means connectible between the frame and the supporting means connecting element and of such length when thus connected as to support at least part of the weight of the frame; means for securing the rear portion of the hitch element against rearward separation relative to the machine; means on the hitch element for connection to the trailer; and means on the frame for securing said frame against rearward separation relative to the machine.

16. For use with an agricultural unit including a vehicle and crop-harvesting means adjustably connected thereto for gathering crops during advance thereof over a field and for conveying such crops rearwardly for ultimate transfer to a trailer operated with the vehicle, and wherein the vehicle has a movable adjusting member connected to and for adjusting the crop-harvesting means and power-operated means detachably connected to the adjusting member: a crop-handling attachment for receiving crops from the crop-harvesting means and for transferring the crops to the trailer, comprising: support means attachable to the rear of the unit and including a pivot on a transverse axis and a connecting element at a level above that of the pivot; frame means having front and rear ends spaced apart longitudinally, and positionable when detached from the unit with its front end substantially at the level of the pivot and with its rear end at a lower level and supported from the ground; means on the front end of the frame means engageable with and sustainable by the pivot when the unit-mounted pivot and said frame means are moved relatively toward each other; means on the support means releasably engageable with the adjusting member for the crop-harvesting means for holding the adjusting member fixed against adjustment to free the power-operated means therefrom; attachment link means having a first connecting portion connected to the frame means and a second connecting portion detachably connectible to the free power-operated means so that operation of the power-operated means is effective to pivot the frame means upwardly about its pivot-sustained front end whereby to raise its rear end clear of the ground; a trailer hitch member detachably connectible to the unit to extend therefrom as a cantilever and positionable after raising of the frame means to engage and temporarily support said raised frame means so that the attachment link means can be detached from the power-operated means; means on the attachment link means for connection to the support means connecting element; and means operative between the frame means and the support means for retaining said frame means against rearward displacement relative to the support means.

17. For use with an agricultural unit including a vehicle and crop-harvesting means adjustably connected thereto for gathering crops during advance thereof over a field and for conveying such crops for ultimate transfer to a trailer operated with the vehicle, and wherein the vehicle has an adjusting member connected to and for adjusting the crop-harvesting means and power-operated means detachably connected to the adjusting member: a crop-handling attachment for receiving crops from the crop-harvesting means, comprising: support means attachable to the unit and including a pivot on a transverse axis and a connecting element at a level spaced from that of the pivot; a frame having opposite end portions spaced apart, and positionable when detached from the unit with its one end substantially at the level of the pivot and with its other end at a lower level and supported from the ground; means on the one end of the frame engageable with and sustainable by the pivot when the unit-mounted pivot and said frame are moved relatively toward each other; means on the support means releasably engageable with the adjusting member for the crop-harvesting means for holding the adjusting member fixed against adjustment to free the power-operated means therefrom; attachment link means having a first connecting portion connected to the frame and a second connecting portion detachably connectible to the free power-operated means so that operation of the power-operated means is effective to pivot the frame upwardly about its pivot-sustained end whereby to raise its other end clear of the ground; means detachably positionable after raising of the frame to engage and temporarily support said raised frame so that the attachment link means can be detached from the power-operated means; means on the attachment link means for connection to the support means connecting element; and means operative between the frame and the support means for retaining said frame against rearward displacement relative to the support means.

18. Mounting means for attaching an agricultural implement to a tractor of the type having a longitudinal body carried on front and rear wheels and including a rear-mounted drawbar, comprising: a pair of supports, each of L shape and having an upright leg and a horizontal shaft portion, arrangeable respectively at opposite sides of the tractor with the shaft portions projecting laterally outwardly and coaxial on a transverse axis intermediate the front and rear wheels of the tractor and ahead of the drawbar, and with the legs respectively adjacent to opposite side portions of the tractor body; means on each leg for effecting affixation of the leg to its proximate side portion of the tractor body; a tie brace for cross-connecting the supports and having opposite ends positionable respectively at the junctions of the legs and shaft portions of the supports; a pair of truss braces, each having first and second ends, positionable to extend longitudinally with said first ends respectively adjacent to the opposite ends of the tie brace and said second ends adjacent to the tractor drawbar; means for securing the first end of one truss brace and the proximate end of the tie brace to the junction of the leg and shaft portion of one support; means for securing the first end of the other truss brace and the other end of the tie brace to the other support at the junction of the latter's leg and shaft portion; and means for securing the second ends of the truss braces to the drawbar.

19. The invention defined in claim 18, in which: the truss braces are arranged to converge rearwardly from their first ends to their second ends; and the means for securing said second ends to the drawbar is a single means common to said second ends.

20. Mounting means for attaching an agricultural implement to a tractor of the type having a longitudinal body carried on front and rear wheels, comprising: a pair of supports, each of L shape and having an upright leg and a horizontal shaft portion, arrangeable respectively at opposite sides of the tractor with the shaft portions projecting laterally outwardly and coaxial on a transverse axis intermediate the front and rear wheels of the tractor, and with the legs respectively adjacent to opposite side portions of the tractor body; means on each leg for effecting affixation of the leg to its proximate side portion of the tractor body; a tie brace for cross-connecting the supports and having opposite ends positionable respectively at the junctions of the legs and shaft portions of the supports; a pair of truss braces, each having first and second ends, positionable to extend longitudinally with said first ends respectively adjacent to the opposite ends of the tie brace and said second ends adjacent to a portion of the tractor spaced from the supports; means for securing the first end of one truss brace and the proximate end of the tie brace to the junction of the leg and shaft portion of one support; means for securing the first end of the other truss brace and the other end of the tie brace to the other support at the junction of the latter's leg and shaft portion; and means for securing the second ends of the truss braces to the tractor at said portion spaced from the supports.

21. The invention defined in claim 20, in which: each support is provided at its junction with eye means; each end of the tie brace has eye means for registration with the eye means of the proximate support; and the first end of each truss brace is formed to extend through the respective registered eye means and has a securing element for rigidly connecting said first end and the two registered eye means.

22. The invention defined in claim 20, in which: each truss brace is longitudinally adjustable to aline the shaft portions in a transverse upright plane and the tie brace along its length to vary the angle of each shaft portion relative to the horizontal.

23. Mounting means for attaching an agricultural implement to a tractor of the type having a longitudinal body carried on front and rear wheels and including a rear-mounted drawbar, comprising: a supporting structure in the shape of an A as viewed from above and arrangeable horizontally beneath the tractor body with the apex of the A adjacent to the drawbar, with the legs of the A extending forwardly to lie respectively adjacent to opposite side portions fo the body ahead of the drawbar, and with the crossbar of the A transverse to the body; said crossbar having at each end thereof an outward extension projecting beyond the proximate leg of the A and beyond the proximate side portion of the tractor body; each extension comprising an agricultural-machine-mounting member, and said members being transversely alined; means on the legs of the A for affixing the supporting structure to the tractor body; and means at the apex of the A for affixing the supporting structure to the drawbar.

24. Mounting means for attaching an agricultural implement to a tractor of the type having a longitudinal body carried on front and rear wheels, comprising: a supporting structure in the shape of an A as viewed from above and arrangeable horizontally beneath the tractor body with the apex of the A adjacent to one end of the tractor with the legs of the A extending longitudinally to lie respectively adjacent to opposite side portions of the body intermediate the front and rear ends of the tractor, and with the cross bar of the A transverse to the body; said crossbar having at each end thereof an outward extension projecting beyond the proximate leg of the A and beyond the proximate side portion of the tractor body; each extension comprising an agricultural-machine-mounting member, and said members being transversely alined; means on the legs of the A for affixing the supporting structure to the tractor body; and means at the apex of the A for affixing the supporting structure to the tractor.

25. The invention defined in claim 24, in which: the agricultural-machine-mounting members are respectively stub shafts coaxial on a transverse axis.

26. For a tractor-harvester unit of the type in which the tractor has a longitudinal body carried on a transverse rear axle structure and including above and adjacent to said structure a power lift member rockable on a transverse axis and the harvester has a crop-harvesting unit alongside the tractor body ahead of and connected to the tractor axle structure for vertical adjustment relative to the tractor: an upright support attachable to the axle structure to depend therefrom; a crop-handling unit positionable behind the tractor axle structure to receive crops from the harvesting unit, and having mounting means thereon selectively connectible to and disconnectible from the support by means of a pivot on a transverse axis below the level of the axis of the tractor power lift member, whereby the crop-handling unit may be moved about said pivot between a first position clear of the ground and a second position supported at least in part from the ground; bell-crank means rockable on the support intermediate the pivot of the crop-handling means and the axis of the tractor power lift member; first force-transmitting means connected to and extending forwardly from one arm of the bell-crank means to the harvesting unit; second force-transmitting means connectible at one end to the tractor power lift member and selectively connectible at its other end to either the other arm of the bell-crank means or the crop-handling unit for selectively effecting either vertical movement of the crop-handling unit or rocking of the bell-crank means by means of the power lift member; first releasable means engageable between the support and the bell-crank means for limiting movement of the bell-crank means when disconnected from the second force-transmitting means; and releasable means engageable between the support and the crop-handling unit for holding the crop-handling unit against vertical movement when disconnected from the second force-transmitting means.

27. For a tractor-harvester unit of the type in which the tractor has a longitudinal body carried on a transverse axle structure and including a movable power lift member and the harvester has a crop-harvesting unit adjacent the tractor body at one side of and connected to the tractor axle structure for vertical adjustment relative to the tractor: a support attachable to the tractor axle structure; a crop-handling unit positionable at the other side of the tractor axle structure to receive crops from the harvesting unit, and having mounting means thereon selectively connectible to and disconnectible from the support by means of a pivot on a transverse axis whereby the crop-handling unit may be moved about said pivot between a first position clear of the ground and a second position supported at least in part from the ground; a power-receivable intermediary element movable on the support; first force-transmitting means connected to the intermediary element and connectible to the harvesting unit; second force-transmitting means connectible at one end to the tractor power lift member and selectively connectible at its other end to either the intermediary element or the crop-handling unit for selectively effecting either vertical movement of the crop-handling unit or movement of the intermediary element by means of the power lift member; means selectively connectible and releasable between the support and the intermediary element when disconnected from the second force-transmitting means; and means selectively connectible and releasable between the support and the crop-handling unit for holding the crop-handling unit against vertical movement when disconnected from the second force-transmitting means.

28. For a tractor-harvester unit of the type having a movable power lift member, a crop-harvesting unit connected to the tractor for vertical adjustment relative to the tractor and a movable adjusting member connected to the crop-harvesting unit and detachably connected to the power lift member: a support attachable to the tractor; a crop-handling unit positionable adjacent to the tractor to receive crops from the harvesting unit, and having pivotal mounting means thereon selectively connectible to and disconnectible from the support to mount the crop-handling unit for movement vertically about said pivot between a first position clear of the ground and a second position supported at least in part from the ground; force-transmitting means connectible to the tractor power lift member and selectively connectible to either the adjusting member or the crop-handling unit for selectively effecting movement of either of said units by means of the power lift member; releasable means between the support and the adjusting member for limiting movement of the harvesting unit during disconnection therefrom of the force-transmitting means; and second releasable means between the support and the crop-handling unit for holding the crop-handling unit against vertical movement when disconnected from the force-transmitting means.

References Cited in the file of this patent

UNITED STATES PATENTS

| Number | Name | Date |
| --- | --- | --- |
| 2,160,486 | Oehler et al. | May 30, 1939 |
| 2,401,183 | Pool et al. | May 28, 1946 |
| 2,415,013 | Kubitz | Jan. 28, 1947 |
| 2,444,561 | Fergason | July 6, 1948 |
| 2,458,782 | Hyman et al. | Jan. 11, 1949 |
| 2,507,711 | Hardy et al. | May 16, 1950 |
| 2,524,083 | Ronning | Oct. 3, 1950 |
| 2,584,322 | Baldwin et al. | Feb. 5, 1952 |